Jan. 2, 1951 R. K. BOYER 2,536,717
VULCANIZING CLAMP
Filed March 27, 1948 2 Sheets—Sheet 1
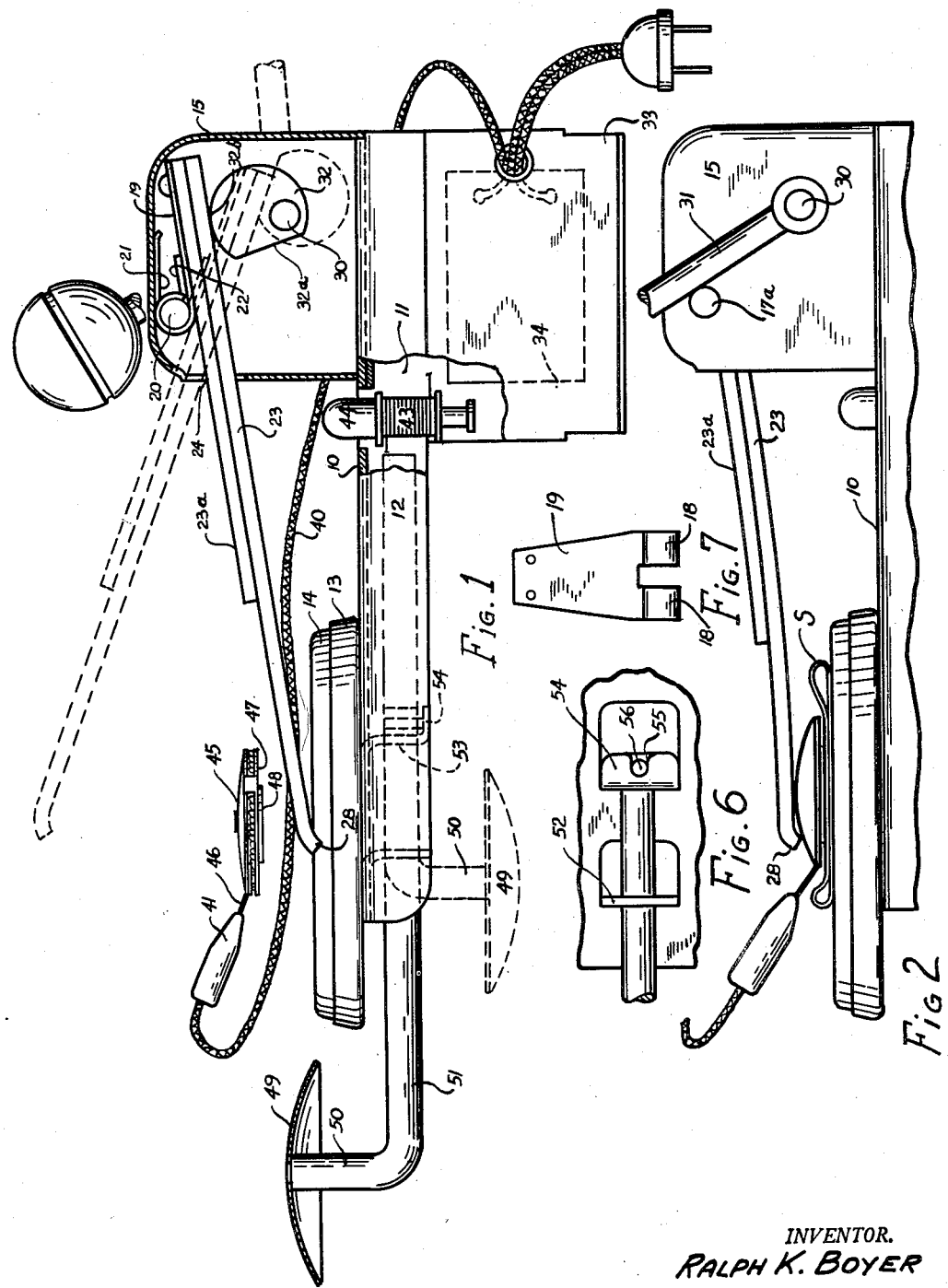
INVENTOR.
RALPH K. BOYER
BY
Kwis, Hudson, Boughton & Williams
ATTORNEYS Jan. 2, 1951 R. K. BOYER 2,536,717
VULCANIZING CLAMP
Filed March 27, 1948 2 Sheets-Sheet 2
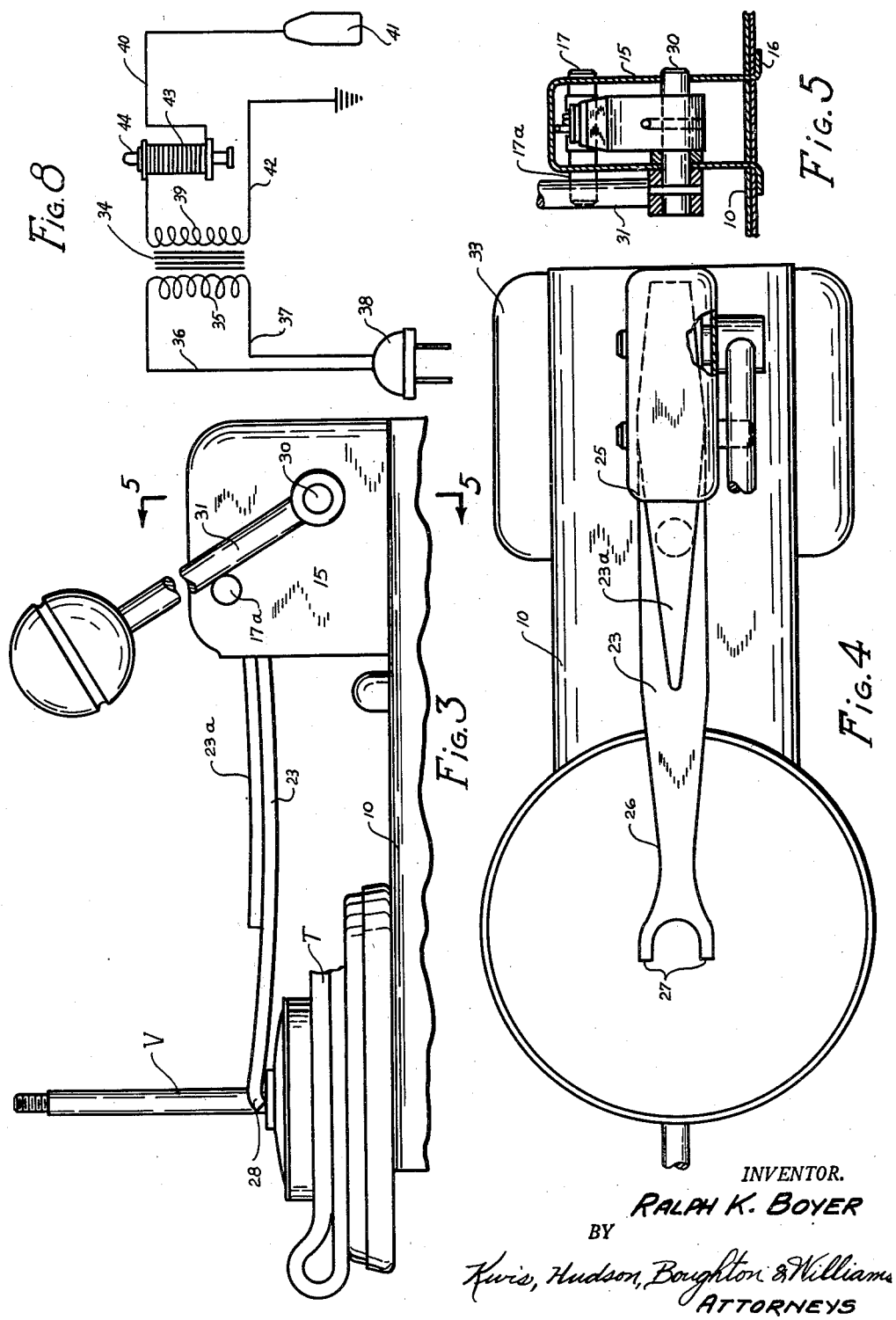
INVENTOR.
RALPH K. BOYER
BY
Kwis, Hudson, Boughton & Williams
ATTORNEYS Patented Jan. 2, 1951

2,536,717

UNITED STATES PATENT OFFICE 2,536,717

VULCANIZING CLAMP

Ralph K. Boyer, Cleveland, Ohio, assignor to The Dill Manufacturing Company, Cleveland, Ohio, a corporation of Ohio Application March 27, 1948, Serial No. 17,510

9 Claims. (Cl. 18—18)

This invention relates to a vulcanizer clamp and particularly to a clamp to be used with an electrically heated vulcanizing unit that is separable from the clamp, although, of course, the clamp could be employed with other types of vulcanizing devices.

An object of the invention is to provide a vulcanizer clamp which is so constructed that the pressures exerted by the clamping member upon the vulcanizing unit automatically vary in accordance with different operating conditions, with the result that the clamping member will exert automatically when in operative position greater or lesser pressure on the vulcanizing unit depending upon the pressure required for a particular unit and a particular vulcanizing job.

Another and important object is to provide a vulcanizer clamp which is so constructed that only the proper pressure can be exerted by the clamping member on the vulcanizing unit and the operator cannot operate the clamp so as to cause the clamping member to exert excessive or too great pressure on the unit.

Another object of the invention is to provide a vulcanizer clamp which is so constructed as to obviate any tendency for or possibility of the operator applying excessive force in the operation of the clamp and consequently removing the likelihood that the clamp might be damaged from improper operation.

Another object is to provide a vulcanizer clamp which is so constructed that the operator in moving the clamping arm or member to operative position always moves the operating handle to a predetermined position and cannot move the operating handle to a position wherein the clamping arm or member would exert excessive pressure on the vulcanizing unit.

Another object is to provide a vulcanizer clamp as referred to in the last named object and wherein the clamping arm or member automatically when moved to operative position exerts the requisite or proper pressure upon the vulcanizing unit, with such pressure varying in accordance with the requirements for different sized units.

A still further object is to provide a vulcanizer clamp which embodies an improved buffer plate construction and one wherein the buffer plate may be moved readily to an operative position or can be moved easily to an idle position wherein it is out of the way and will not interfere with the vulcanizing operation.

Another object is to provide an improved and novel vulcanizer clamp which is compact, can be readily employed for vulcanizing either plain rubber patches or the rubber bases of valve stems to inner tubes or other rubber articles and which clamp is efficient in operation.

A still further object is to provide a vulcanizer clamp of the type referred to in the preceding objects and which may be used with the ordinary commercial electric current or with current from storage batteries or other sources.

A still further object is to provide a vulcanizing clamp as referred to in the preceding objects and which is so constructed that the clamp itself during the vulcanizing operation is in the electrical circuit with the electrical heating element in the vulcanizing unit employed with the clamp.

Further and additional objects and advantages not hereinbefore referred to will become apparent hereinafter during the following detailed description of an embodiment of the invention which is illustrated in the accompanying drawing, wherein Fig. 1 is a view, partly in side elevation and partly in longitudinal section, of a clamp embodying the invention; the buffer plate and its supporting parts being shown by full lines in operative position and by dash lines in idle position, while the clamping arm or member is shown by full lines in fully lowered position wherein it is contacting the rubber pad of the vulcanizing table of the clamp and by dash lines in fully raised position.

Fig. 2 is a view similar to Fig. 1 and shows the clamping arm or member in fully lowered or operative position but clampingly engaging a vulcanizing unit placed on a tire tube that is positioned on the vulcanizing table.

Fig. 3 is a view similar to Fig. 2 but showing the clamping arm or member engaging a vulcanizing unit of substantially larger size than the unit shown in Fig. 2 and used for vulcanizing a valve stem to a large size inner tube as, for example, an inner tube used in motor truck tires.

Fig. 4 is a plan view of the clamp, certain portions being broken away and shown in section.

Fig. 5 is a sectional view taken substantially on line 5—5 of Fig. 3 looking in the direction of the arrows.

Fig. 6 is a fragmentary bottom plan view showing part of the buffer plate support.

Fig. 7 is a detached elevational view of the mounting plate or hinge member for the clamp arm, and Fig. 8 is a diagram of the electrical circuit including the transformer and in the secondary circuit of which is located the vulcanizing unit and the clamp.

Preferably, but not necessarily, the clamp is formed largely of sheet metal stampings and comprises a horizontal base or arm 10 which preferably is in the form of a downwardly facing channel the side legs of which are indicated at 11 and 12.

The base 10 at one end thereof, i. e., its left hand end as viewed in the drawing, has secured to its upper side a cup-like container 13 in which is located a rubber pad 14, it being understood that said container 13 and pad 14 constitute the vulcanizing table of the clamp.

The other end of the base 10; i. e., the right hand end as viewed in the drawing, has secured to it an upstanding housing 15. This housing is narrower than the horizontal supporting arm or base 10 and is of substantially inverted U-shape in cross-section and preferably is formed of a drawn metal stamping. The housing 15 is provided on its lower free edges with tabs 16 that extend through suitable openings in the supporting arm or base and are bent over to secure the housing to the supporting arm or base or are welded thereto or are otherwise secured thereto.

The side walls of the housing 15 are provided with aligned openings in which is mounted a pivot pin 17, the said pin extending outwardly of the housing a substantial distance to provide a stop portion 17a for the operating handle of the clamp as will later be explained. The pivot pin 17 extends through the aligned eyes 18 of a mounting or hinge plate 19 while a rat trap spring has its coiled portion 20 mounted on the pin 17 intermediate the eyes 18 with the long extended end 21 of the spring engaging the underside of the top of the housing and with the short extended end 22 of the spring bearing against the mounting plate 19. The pin 17 at the portion which receives the spring coils 20 is provided with a cylindrical recess in which the spring coils are located and hence the rat trap spring functions to hold the pin against axial displacement with respect to the eyes 18 of the mounting plate 19.

The clamping arm is formed of a lever 23 and a spring leaf 23a superimposed on the lever, with the spring leaf extending between the mounting or hinge plate 19 and the lever 23 at the right hand end thereof and being secured to said plate and lever, preferably by means of rivets extending through all three elements. The lever 23 has a wide portion 25 intermediate its ends and which extends inwardly of the housing to a point just inwardly of the pivot 17. From this point the lever 23 reduces in width to its right hand end while the lever outwardly of the portion 25 diminishes in width gradually and uniformly to the point 26. This outer diminishing portion of the lever provides flexibility therein. From the point 26 to its left hand end the lever 23 gradually widens in width and said left hand end of the lever is in the form of a fork as indicated at 27 (Fig. 4) with the ends of the tines of the fork being curved downwardly as indicated at 28. The spring leaf 23a has an inner portion which is complementary to the upper surface of the lever 23 while from just above the pivot 17 said spring leaf diminishes gradually and uniformly in width to its outer end which is located at the outer end of the portion 25 of uniform width of the lever 23.

The clamping arm or lever 23 and spring leaf 23a possess a desired and predetermined degree of flexibility so that when the arm is pressed against a vulcanizing unit later to be explained it will have more or less spring flexure between the fulcrum of the pin 17 and the outer end of the arm and will exert varying degrees of pressures on the vulcanizing units employed in the clamp depending upon the thickness or size of the units and of the tire tubes or other articles to which a patch is being vulcanized.

The housing 15 has its side walls provided with aligned openings in which is journaled a pin 30, said pin projecting outwardly of the housing at one side to receive and have fixed thereto the hub of an operating handle 31. An operating cam 32 is fixed to the pin 30 within the housing 15 and has a flat low portion 32a and a curved camming portion, the high point of which is indicated at 32b. The underside of the clamping arm 23 is held at all times by the rat trap spring in engagement with the periphery of the cam 32.

It will be seen that when the handle 31 is rocked to bring the high point 32b of the cam in contact with the underside of the clamping arm or lever, said arm or lever is rocked about the axis of the pin 17 to lowered or operative position. At this time the operating handle 31 will be in engagement with the extended stop portion 17a of the pin 17, wherefore the operator will know that the high point of the cam 32 has been brought into contact with the underside of the clamping arm. When the operating handle 31 is rocked in the opposite direction and away from the stop portion 17a of the pin 17 the flat surface 32a of the cam 32 will be brought into contact with the underside of the clamping arm and the rat trap spring will act to raise the clamping arm to the dash line or idle position shown in said Figure 1. The operator can tell by the feel of the movement of the operating handle 31 when the parts are in the dash line position of Fig. 1.

A transformer housing 33 preferably formed of sheet metal is secured to the underside of the horizontal or base arm 10 of the clamp and beneath the housing 15. The transformer housing 33 may be secured to the arm 10 by means of tabs passing through openings in the arm 10 and secured to the arm as by welding. A suitable transformer 34 is located in the housing 33 and the primary 35 of the transformer is connected by wires 36 and 37 to a connecting plug 38 whereby the transformer may be electrically connected to a suitable source of electrical energy.

The secondary 39 of the transformer is connected by a wire 40 to a connecting clip 41 of the spring type and well known in the art. A wire 42 connects the other side of the secondary 39 of the transformer to the clamp itself, wherefore the clamp forms part of the secondary circuit. If desired, an electrically actuated signal may be included in the secondary circuit to visually indicate when said circuit is energized. This signal may take the form of a solenoid, the coil 43 of which is in the wire 40 while the core 44 functions as the signal, it being understood that when the coil 43 is energized the core 44 will be moved upwardly to a clearly visible point wherefore the operator can tell at a glance that the secondary circuit is energized. If desired, the indicating end of the core may be colored red or some other readily seen color to facilitate the visual indication by the device that the secondary circuit is energized.

While various types of vulcanizing units may be employed in the clamp it is proposed to use a vulcanizing unit of the general type of that shown in Crowley Reissue Patent No. 21,230, dated October 10, 1939. This type of vulcanizing unit comprises a member 45 which contains the electrical heating element and has a contact tab 46 to which the spring connecting clip 41 can be connected. The vulcanizing unit also includes a metal disk member 47 carrying the vulcanizing patch 48 and in use the member 45 of the unit is superimposed upon the member 47. When the unit is placed on a tire tube or other article to which a patch is to be vulcanized and the clamping arm 23 is brought into contact with the upper side of the member 45 and the clip 41 is connected to the tab 46 then the electrical heating element of the unit is in the secondary circuit including the wire 40, the member 45, the clamping arm 23 and wire 42.

As is well understood in the art, it is usually desirable and necessary to buff that portion of the tire tube or article to which the patch is to be vulcanized. It is proposed to provide a convenient buffing plate arrangement on the clamp for this purpose and one which can be quickly and easily moved to an idle position after the buffing has been accomplished.

A convex buffing plate 49 is secured to the end of the short arm 50 of an angle rod that has its long arm 51 slidably supported in an opening formed in a downwardly bent lug 52 cut from the horizontal arm or base 10. The long arm 51 of the rod also slidably extends through an opening in a lug 53 likewise cut from the horizontal arm or base 10 and extending downwardly in parallel relation to the lug 52. The lug 53 at its lower end is provided with a horizontal portion 54 that has formed therein a notch 55 adapted to receive a pin 56 carried by the long arm 51 of the rod. When the buffing plate 49 is in the operative position shown in full lines in Fig. 1 the pin 56 is located in the notch 55 and the buffing plate and the rod are thus held in operative position against rocking movement.

When it is desired to move the buffing plate to an idle position, i. e., the dash line position of Fig. 1, all that the operator need do is move the buffing plate and the rod slightly toward the right to disengage the pin 56 from the notch 55 and thereafter to swing the buffing plate and the rod downwardly either manually or by gravity and then position the buffing plate and the rod farther toward the right until the short arm 50 of the rod is contacting or substantially contacting the lug 52 at which time the buffing plate will be located in idle position beneath the vulcanizing table.

In Fig. 1 the clamping lever or arm is shown in full lines in its lowermost position at which time the forked end 27 thereof is contacting the rubber pad 14 of the vulcanizing table since no vulcanizing unit or tube is mounted on the table. At this time the high point 32b of the operating cam 32 is in engagement with the underside of the short portion of the clamping arm 23 and the operating handle 31 is contacting the stop portion 17a of the pivot pin 17. It will be noted that there is a very slight flexure of the long portion of the clamping lever when these conditions prevail.

Assuming that the clamp is to be used for vulcanizing a small size patch on a tire tube and which operation will require a small size vulcanizing unit, the following procedure is followed. The operator moves the buffer plate toward the left as viewed in the drawing from the dash line position of Fig. 1 and when it is clear of the vulcanizing table rocks the plate and rod upwardly until the buffer plate is substantially in the position shown in full lines in Fig. 1, whereupon he moves the buffer plate and rod somewhat farther to the left to engage the pin 56 in the notch 55. The operator then places the tire tube S on the buffer plate and buffs the spot to which the patch is to be vulcanized. When this has been completed the buffer plate and rod are moved slightly toward the right to disengage the pin 56 from the notch 55 and then are turned downwardly and moved completely toward the right until the buffer plate is beneath the vulcanizing table and in the position shown in dash lines in Fig. 1. The operator now moves the operating handle 31 to raise the clamping lever 23 to the dash line position of Fig. 1 if he has not previously done so, and at such time the underside of the short portion of the lever is in contact with the flat low portion 32a of the operating cam 32. The operator now places the tire tube S which is a relatively thin and small tube on the vulcanizing table of the clamp and positions the small size vulcanizing unit on the spot where the patch 48 is to be vulcanized. He then connects the clip 41 to the tab 46 of the vulcanizing unit and if he has not already done so he inserts the plug 38 into the electrical socket of a suitable source of electric energy. He also rocks the operating handle 31 toward and against the stop portion 17a of the pin 17 and thus causes the high point 32b of the operating cam 32 to be in engagement with the underside of the short portion of the clamping arm or lever, since the latter has moved downwardly from the dash line position of Fig. 1 into the full line position of Fig. 2.

It will be noted by reference to Fig. 2 that the long portion of the clamping lever 23 and spring leaf 23a are noticeably flexed and are pressing on the vulcanizing unit with the proper pressure for the small size vulcanizing unit and thin tire tube. As soon as the clamping lever has contacted the vulcanizing unit the secondary circuit is completed since said lever is in the secondary circuit. Therefore the electrical resistance element of the vulcanizer unit is energized to provide the heat of vulcanization and at such time the coil 43 is energized, and the signalling device 44 moves upwardly to signalling position.

When the vulcanizing operation is finished the operator rocks the handle 31 in a clockwise direction, as viewed in Fig. 2, away from the stop portion 17a of the pin 17 and into a position wherein the flat portion 32a of the operating cam is contacting the underside of the short portion of the clamping arm or lever and the latter is raised to the dash line position of Fig. 1. If the vulcanizing unit contains a fusible plug which has fused under the vulcanizing heat the secondary circuit has been interrupted before the clamping lever is raised. However, if the vulcanizing unit does not include such a fusible plug then the secondary circuit is interrupted as soon as the clamping arm has been raised upwardly and is out of contact with the vulcanizing unit.

In Fig. 3 the tube on the vulcanizing table is a relatively thick inner tube T, such as used in motor truck tires while the vulcanizing units is similar to the unit previously described but of substantially larger size and hence greater thickness. These facts mean that the clamping lever 23 will engage the vulcanizing unit at a higher level than it engaged the smaller vulcanizing unit previously referred to but since the fulcrum pin 17 is fixed and the high point 32b of the operating cam is now in contact with the underside of the clamping arm the long portion of the latter will be substantially flexed, as clearly indicated in Fig. 3, and such greater flexure will exert the requisite additional pressure for vulcanizing a large patch or valve stem base to the large tube.

In Fig. 3 instead of a patch being vulcanized to the tube T the base of a valve stem V is being vulcanized to the tube. The stem V extends through the central hollow rivet of the vulcanizing unit and the fork 27 of the clamping lever straddles the stem while the down turned tines 28 of the fork contact the vulcanizing unit on each side of the stem.

It will be understood that should the tire tube to which the patch is being vulcanized be of a size intermediate the tire tube S and tire tube T and the vulcanizing unit be of a size between the sizes of the units shown in Figs. 2 and 3, respectively, then when the clamping lever 23 is brought into engagement with such vulcanizing unit the flexure of the clamp arm will be intermediate the small flexure of Fig. 2 and the large flexure of Fig. 3 and hence the clamp arm will be exerting clamping pressure intermediate the pressure it is exerting in Figs. 2 and 3. In other words, since the fulcrum of the clamping lever is fixed and the high point of the cam 32 is always in contact with the underside of the clamping arm or lever when the operating handle is in engagement with the stop portion 17a of the pivot pin, varying pressures will be exerted on the different size vulcanizing units by reason of the varying flexures of the arm or lever and hence the clamping arm or lever automatically will exert greater or lesser pressure on the vulcanizing units in accordance with the varying size of the units and of the tire tubes or inflatable articles to which the patch is to be vulcanized.

Thus the present clamp provides automatically the proper and required pressures under varying conditions of operation and varying sizes of vulcanizing units. It will also be noted that the operator can never cause the clamping arm or lever to exert excessive pressure on the vulcanizing unit since he can only move the operating handle until it contacts the stop portion 17a. Similarly the operator will be unable to injure any of the parts of the clamp by reason of improperly operating the clamp as, for example, by applying greater pressure or force to any of the operating parts than is actually required for the proper operation of the clamp.

It will be understood that the clamp may be used with an electrical source such as a storage battery, in which event the transformer is not utilized. One lead from the battery would be connected to the tab 46 and the other lead therefrom would be connected to some part of the clamp itself.

Although a preferred embodiment of the invention has been illustrated and described, it will be understood that the invention is susceptible of various modifications and adaptations within the scope of the appended claims.

Having thus described my invention, I claim:

1. A vulcanizer clamp comprising a supporting base provided with a vulcanizing table for receiving the article to be vulcanized and a vulcanizing unit, fulcrum means supported by said base in spaced relation to said table, a flat spring lever carried by said fulcrum means to have its broad dimension extending in the direction of the axis of said fulcrum means and adapted to be rocked into clamping contact with said unit on said table and having a relatively long portion extending from said fulcrum means to a point above said table and a relatively short portion extending from said fulcrum means in the opposite direction, and means operatively engaging with the flat underside of said short portion for rocking said lever to and from contact with said unit.

2. A vulcanizer clamp as defined in claim 1 and wherein the long portion of said lever is formed to have predetermined flexibility.

3. A vulcanizer clamp as defined in claim 1 and wherein a portion of said lever is flexible and diminishes uniformly in width to adjacent the outer end of said portion.

4. A vulcanizer clamp as defined in claim 1 and wherein the means operatively associated with the short portion of said lever for rocking the latter comprises a cam rockably supported by said base and having its periphery cooperating with the underside of said short portion of the lever and provided with a high point and a flat low portion, and a spring operatively associated with said lever and maintaining the short portion thereof in contact with the periphery of said cam at all times.

5. A vulcanizer clamp comprising a supporting base provided with a vulcanizing table for receiving the article to be vulcanized and a vulcanizing unit, a housing carried by said base and spaced from said table, a fulcrum pin mounted in said housing, said housing being provided with an opening in the side thereof adjacent to said table, a flat spring lever rockably carried by said pin with its broad dimension extending longitudinally of said pin and projecting outwardly of said housing through said opening and having its outer end overlying said table and adapted to be engaged with said vulcanizing unit thereon, said lever from outwardly of said opening to adjacent its outer end varying in width gradually and uniformly and having predetermined flexibility, and means carried by and located within said housing and operatively associated with the flat underside of said lever adjacent the inner end thereof for rocking said lever to cause its outer end to move to and from contact with said vulcanizing unit.

6. A vulcanizer clamp as defined in claim 5 and wherein a hinge plate is secured to the upper side of said lever adjacent its inner end and the eyes of said hinge plate are rockably supported by said fulcrum pin, while a rat trap spring has its coil portion surrounding said fulcrum pin between the eyes of said hinge plate with one end of said spring contacting said housing and the other end contacting said hinge plate, and a cam rockably supported by said housing with its periphery operatively associated with the underside of said lever and provided with a high point and a low flat portion.

7. A vulcanizer clamp as defined in claim 6 and wherein said cam is fixed on a rockable shaft carried by said housing and which shaft extends outwardly of said housing and an operating handle is secured to the outwardly extending end of said shaft.

8. A vulcanizer clamp as defined in claim 6 and wherein said fulcrum pin extends outwardly of said housing on one side thereof while said cam is fixed to a rockable shaft supported by said housing and extending outwardly of said one side thereof, a handle is operatively secured to said outwardly extending end of said shaft such that when said handle is moved to rock said shaft and cam and position the high point of the cam in contact with the underside of the lever said handle will be engaging the outwardly extending end of said fulcrum pin.

9. A vulcanizer clamp as defined in claim 1 and wherein said lever comprises a lever proper and a spring leaf superimposed on said lever proper and secured thereto at one end and of gradually diminishing width from said fulcrum means to the outer end of the spring leaf.

RALPH K. BOYER.

REFERENCES CITED

The following references are of record in the file of this patent:

UNITED STATES PATENTS

| Number | Name | Date |
|---|---|---|
| 1,153,059 | Ginter | Sept. 7, 1915 |
| 1,171,038 | Gard | Feb. 8, 1916 |
| 1,204,021 | Horsey | Nov. 7, 1916 |
| 1,218,245 | Draver | Mar. 6, 1917 |
| 1,254,166 | Staley | Jan. 22, 1918 |
| 1,270,154 | Heim | June 18, 1918 |
| 1,281,469 | Wood | Oct. 15, 1918 |
| 1,632,544 | Fox | June 14, 1927 |
| 2,138,620 | Strange | Nov. 29, 1938 |
| 2,154,183 | Raney | Apr. 11, 1939 |
| 2,447,740 | Crowley | Aug. 24, 1948 |